March 29, 1932.  W. G. WILSON  1,851,143
JOINT STRUCTURE FOR PIPES AND THE LIKE
Filed Feb. 28, 1930  2 Sheets-Sheet 1
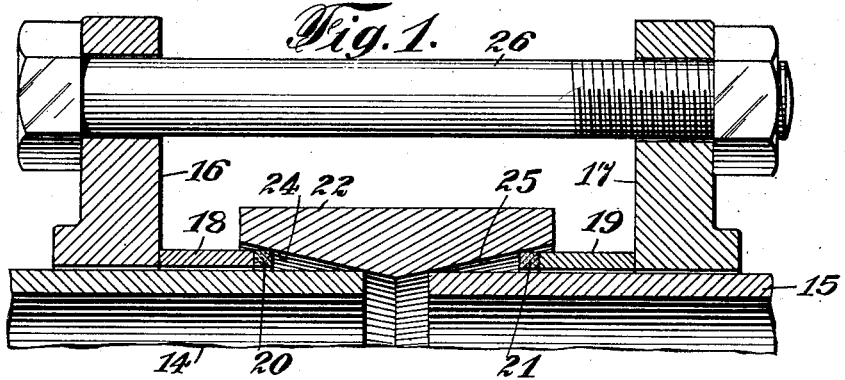
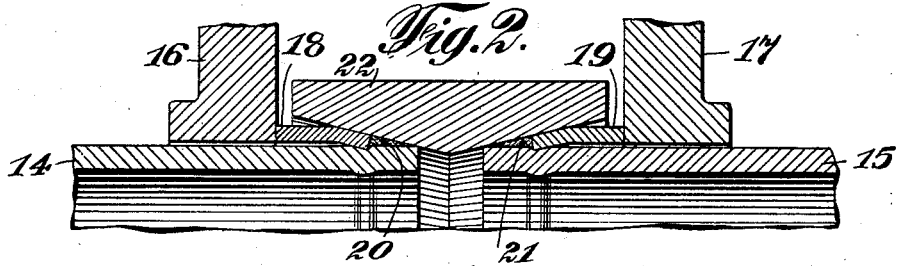
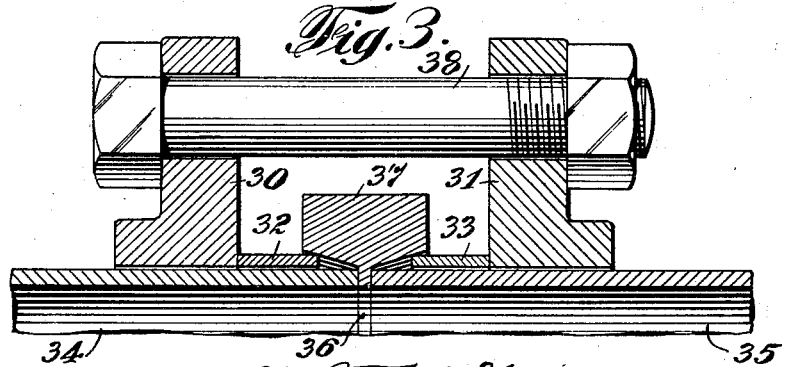
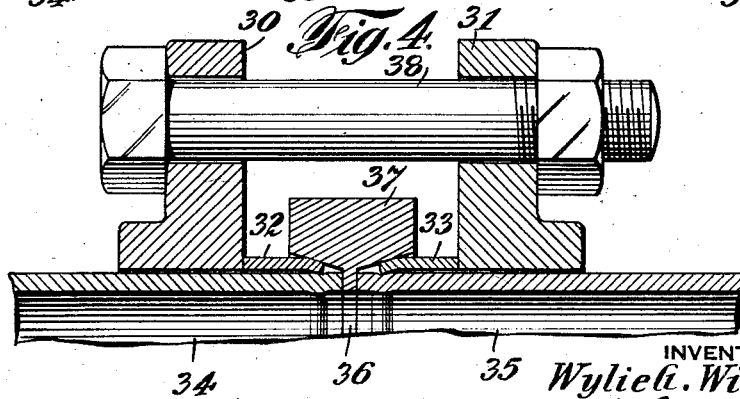
INVENTOR
Wylie G. Wilson
ATTORNEY March 29, 1932.   W. G. WILSON   1,851,143
JOINT STRUCTURE FOR PIPES AND THE LIKE
Filed Feb. 28, 1930   2 Sheets-Sheet 2
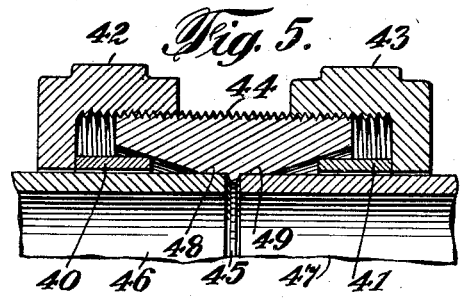
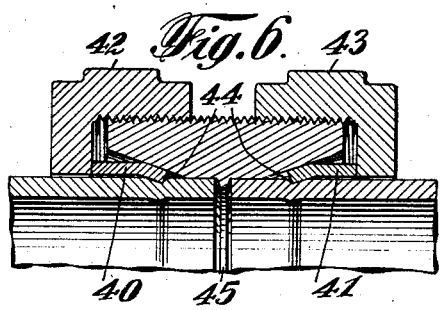
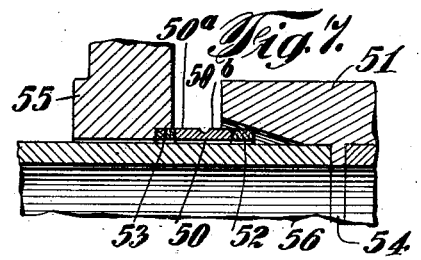
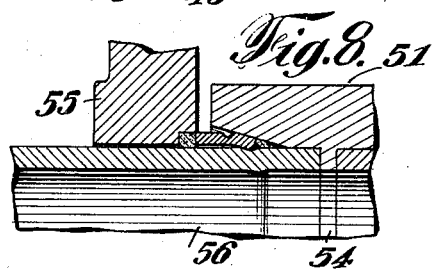
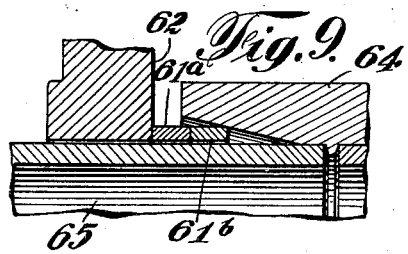
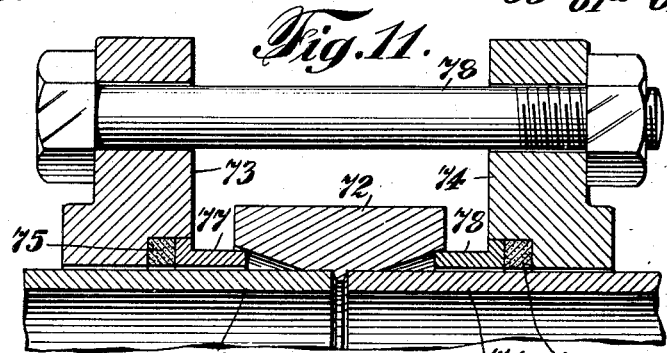
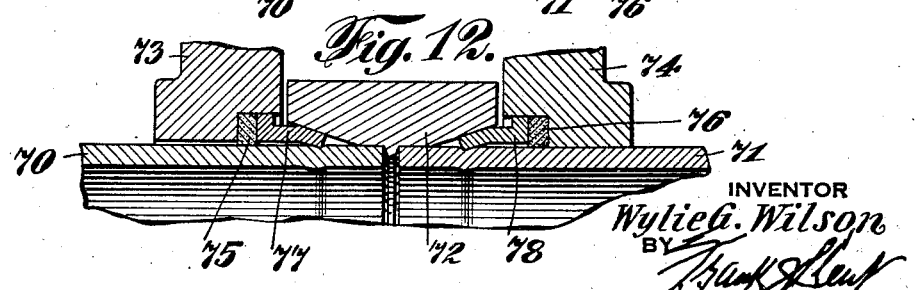
INVENTOR
Wylie G. Wilson
BY
ATTORNEY Patented Mar. 29, 1932

1,851,143

UNITED STATES PATENT OFFICE

WYLIE G. WILSON, OF ELIZABETH, NEW JERSEY

JOINT STRUCTURE FOR PIPES AND THE LIKE

Application filed February 28, 1930. Serial No. 432,006.

This invention relates to joints. It is particularly applicable to the joining of pipes and will be discussed and disclosed as applied to pipes. The invention may, however, be used for joining rods, shafts, or the like.

In much commercial pipe some or all of the following conditions are encountered: (1) Pipe of a given nominal size varies considerably in actual size; (2) the surface of the pipe is rough as a whole and is covered with scale; (3) rough spots are present due to rough welds and to raised letter trade-marks and manufacturers' names; (4) the surface of the pipe may be pitted; and (5) the pipe may be out of round. The foregoing conditions are particularly numerous in what is commercially known as "black pipe". These conditions make it difficult to satisfactorily join pipe without special preparation of the ends of the pipe sections. Accordingly, most of the prior art joints require special preparation of the ends of the pipe. In some instances attempts have been made to join pipe without special preparation of the ends, but such prior art joints are not capable of satisfactorily coping with the conditions encountered in commercial black pipe, particularly where a joint is desired that will stand high temperatures and/or high pressures. In some classes of service it is necessary to repeatedly make and break joints that must be capable of standing high temperatures and/or high pressures. An example of such class of service is to be found in stills for oil cracking, where the pipes have to be frequently disconnected for cleaning.

The general object of the present invention is to provide a high pressure joint (and/or method of making) which is applicable to commercial black pipe without preparation of the ends of the pipe.

Another object of the invention is to provide a joint structure which for a given nominal size of pipe will be satisfactorily applicable to pipe of all commercial variations in size, without selection of parts or special preparation or handling of the parts.

Another object of the invention is to provide a joint (and/or method of making a joint) which will stand several times the customary test pressure.

A further and important object of the invention is to provide a high pressure joint which can be readily made and broken.

A still further object of the invention is to provide an inexpensive, reliable high pressure joint which can be satisfactorily installed by unskilled workers and without special tools.

Other objects of the invention will be obvious from the following disclosure.

Fig. 1 of the drawings is a fragmentary sectional view of one form of the invention as applied to commercial black pipe, the view showing the parts assembled preparatory to making the joint.

Fig. 2 is a fragmentary sectional view showing the joint completed from the assembly of Fig. 1.

Fig. 3 is a fragmentary sectional view showing a second form of the invention as applied to seamless tubing or to pipe with the ends machined to size. The view shows the parts assembled preparatory to making the joint.

Fig. 4 is a fragmentary sectional view showing the joint completed from the assembly of Fig. 3.

Fig. 5 is a fragmentary sectional view showing a third form of the invention as applied to seamless tubing or to pipe with the ends machined to size. The view shows the parts assembled preparatory to making the joint.

Fig. 6 is a fragmentary sectional view showing the joint completed from the assembly of Fig. 5.

Fig. 7 is a fragmentary sectional view showing a form of the invention embodying locking rings of modified form. The figure shows the invention as applied to commercial black pipe, the parts being assembled preparatory to making the joint.

Fig. 8 is a fragmentary sectional view showing the joint completed from the assembly of Fig. 7.

Fig. 9 is a fragmentary sectional view showing a form of the invention embodying locking rings which are still further modified.

The invention is shown as applied to seamless tubing or to pipe with ends machined to size; and the parts are shown assembled preparatory to making the joint.

Fig. 10 is a fragmentary sectional view showing the joint completed from the assembly of Fig. 9.

Fig. 11 is a fragmentary sectional view showing another form of the invention which is particularly adapted for joining commercial black pipe. The figure shows the parts assembled preparatory to making the joint.

Fig. 12 is a fragmentary sectional view showing the joint completed from the assembly of Fig. 11.

Reference will now be had to Figs. 1 and 2. Slipped loosely over pipe ends 14 and 15, are flanges 16 and 17, locking rings 18 and 19, and gaskets 20 and 21. The locking rings 18 and 19 are of obdurate but ductile metal such as machine steel, brass, malleable or ductile bronze, or the like. The locking rings are shown as band-like or tubular sections that are preferably thinner than the walls of the pipe to be joined. In actual practice the locking rings may be about half the thickness of the pipe, and suitable rings may be made by cutting short lengths from seamless tubing of suitable size, material and wall thickness. The gaskets 20 and 21 are preferably of suitable material which does not deteriorate with age and under the action of heat, e. g. asbestos.

After the flanges, locking rings and gaskets have been applied to the pipe, the pipe ends are pushed as far as conveniently possible into a rigid center piece 22 having annular cam surfaces 24 and 25. This center piece may be of steel or cast iron and is of such thickness that it is virtually non-expansible even under the action of very strong expansive forces. At its center the interior diameter of the center piece is less than the minimum external diameter of commercial pipe of the nominal size for which it is designed. The rings 18 and 19 are large enough to slip over the largest commercial pipe of the nominal size for which they are designed; and at its ends center piece 22 is somewhat larger than rings 18 and 19.

After the parts have been assembled as shown in Fig. 1, the flanges 16 and 17 are drawn toward one another by any suitable means such as bolts 26 (one shown). This movement advances rings 18 and 19 and gaskets 20 and 21. The rings drive the gaskets ahead of them and as the rings engage the cam surfaces 24 and 25, the forward ends of the rings are constricted and reduced in size. As the movement continues the inner leading corners of the locking rings grip the pipe sections and in actual practice usually form annular grooves therein as shown in Fig. 2. As clearly shown in Fig. 2, the rings 18 and 19 serve to securely lock the pipe sections to center piece 22. For convenience, therefore, I call these rings "locking rings," but if the surface of the pipe be round and reasonably smooth, the rings 18 and 19 will also form a seal. However, as shown in Fig. 2, the gaskets 20 and 21 are completely trapped and confined immediately in advance of the locking rings. In case of surface irregularities such as frequently exist in black pipe the gaskets 20 and 21 are crowded into and around such irregularities and thus complete the seal. These gaskets are so confined that they cannot be blown out by pressure within the pipe. In cases where there are only comparatively slight surface irregularities on the pipe the gaskets may be made of soft steel, copper, or lead.

It will be noted that as the joint is made, there is considerable sliding movement between the rings 18 and 19, and the cam surfaces 24 and 25, respectively. Similarly there is considerable sliding movement between the rings 18 and 19, and the surfaces of pipe sections 14 and 15, respectively. Obviously, very substantial portions of these sliding movements take place while the sliding surfaces are pressed together under considerable pressure; and such sliding under pressure acts to smooth out surface irregularities and produce a sealing fit between the rings and the center piece 22 and between the rings and the surfaces of the pipe sections. In other words, the rings 18 and 19 are not only pressed against the cam surfaces and the pipe surfaces, but they are lapped into sealing fit therewith. This lapping action is improved by applying suitable lubricant (e. g. oil or grease) to the surfaces to be lapped. Such lubrication minimizes the tendency of the sliding surfaces to seize and tear; and it also makes it easier to force the locking rings into final position.

Sufficient compression of the leading ends of the locking rings can be readily obtained with standard flanges and bolts provided the locking rings are properly proportioned in relation to the size of the pipe, the number and size of the flange bolts, and the taper of the cam surfaces 24 and 25. For many purposes, I have found that about a 16° angle of taper of the cam surfaces is satisfactory.

To break the joint it is merely necessary to remove the flange bolts and withdraw one or both of the pipe ends from the center piece. The locking rings 18 and 19 take a permanent set when constricted in making the joint and will remain locked to the pipe ends when they are withdrawn from the center piece. When the joint is broken these locking rings may spring back enough to somewhat loosen their grip on the pipe, but they remain in place and the joint can frequently be remade by simply reinserting the pipe ends in the center piece, replacing the flange bolts and tightening them up. Should the gaskets be damaged in withdrawal, new gaskets can easily be substituted.

The joint of Figs. 3 and 4 is intended primarily for seamless tubing or for pipe having its ends machined to size. With such tubing or pipe the pipe surfaces to be incorporated in the joint are relatively smooth, and with a given nominal size of pipe the actual pipe sizes do not vary greatly. Flanges 30 and 31, and locking rings 32 and 33 are slipped loosely over the pipe ends 34 and 35. The ends of the pipe are then placed against annular rib 36 of center piece 37. After the parts have been assembled as shown in Fig. 3, the flanges 30 and 31 are drawn toward one another by any suitable means such as bolts 38 (one shown). The locking rings are forced against the annular cam surfaces of center piece 37, thus constricting the forward ends of the ring and causing them to grip the pipe as shown in Fig. 4. With pipe such as seamless tubing the locking rings 32 and 33 take a sealing grip on the surface of the pipe ends 34 and 35, respectively, and hence no gaskets are required. The construction and operation of the joint are obviously similar to the joint of Figs. 1 and 2 and hence further description is unnecessary. It will be noted, however, that in Figs. 3 and 4 the interior rib 36 of the center piece completely fills the space between the ends of the pipe, thus giving the interior of the conduit a continuous uniform size at the joint.

In Figs. 5 and 6 locking rings 40 and 41 are forced into locking condition by fittings 42 and 43 which are threaded to center piece 44. Annular rib 45 serves to center the center piece with respect to the pipe ends 46 and 47; and the tips of the pipe ends are received in tubular portions 48 and 49 of the center piece. When the fittings 42 and 43 are drawn up, the locking rings are forced into locking condition as shown in Fig. 6, the general construction and operation of the joint being similar to that of the joints previously described.

It will be noted (in Figs. 1 to 6) that the looser the undeformed locking ring fits the pipe end, the further must the locking ring be forced into the center piece in order to effect a locking grip upon the pipe. The further the locking ring is forced into the center piece, the greater is the cross sectional area of the locking ring that must be compressed and reduced in size, and accordingly, the greater is the force which must be used to compress the locking ring into locking condition. In cases where pipe of a given nominal size varies greatly from actual size, a piece of pipe may be occasionally encountered which is so much under size as to make it somewhat difficult to sufficiently contract a locking ring such as shown in Figs. 1 to 6 inclusive. For such classes of service it is preferable to use a modified locking ring, for example, such as shown in Figs. 7 and 8.

In Fig. 7, there is a ring 50 divided by an annular groove into two parts $50^a$ and $50^b$. In effect, the part $50^a$ is a pusher ring and the part $50^b$ is a locking ring, the two rings being held together by a thin web for convenience in handling the rings and assembling the joint. When the joint is made the ring $50^b$ tilts to conform with the taper of the annular cam surface of center piece 51 and is compressed into locking engagement with the pipe 56. The ring $50^a$ merely serves to push the ring $50^b$ and hence does not itself have to undergo any appreciable amount of compression. With this construction, the cross sectional ring area which must be compressed is limited to the area of ring $50^b$, and hence the locking ring can be satisfactorily applied to a much undersize pipe without applying undue force to the bolts or the like which move flange 55. This construction is particularly adapted for black pipe and gaskets 52 and 53 and may be used to insure a perfect seal, the gasket 52 forming a seal in front of the locking ring and gasket 53 forming a seal behind the pusher ring. In Figs. 7 and 8, only one half of the joint is shown but it will be understood that where a joint is effected between two pieces of pipe, the joint will ordinarily be symmetrical about the annular rib 54.

The construction shown in Figs. 9 and 10 is similar to that shown in Figs. 7 and 8 except that wholly independent pusher and locking rings are used. Locking ring $61^b$ is pushed by pusher ring $61^a$, which in turn is pushed by flange 62 that may be moved in any suitable manner as by the usual flange bolts. As the joint is made the locking ring $61^b$ is tilted to conform with the taper of the annular cam surface of the center piece 64 and is forced into locking engagement with the pipe 65 as shown in Fig. 10. The showing in Figs. 9 and 10 is more particularly for seamless tubing or the like and hence no sealing gaskets are shown.

Reference will now be had to Figs. 11 and 12. Pipe ends 70 and 71 to be joined are telescoped, as shown in Fig. 11, within a center piece 72, each pipe end having previously been provided with a flange, a locking ring, and a gasket. Flanges 73 and 74 are recessed, as shown, to receive gaskets 75 and 76, and the enlarged ends of locking rings 77 and 78. After the parts have been assembled, as shown in Fig. 11, the flanges 73 and 74 are drawn toward one another by any suitable means such as bolt 78 (one shown). This movement of the flanges causes the forward ends of the locking rings 77 and 78 to be constricted into locking engagement with the pipe, as shown in Fig. 12. The gaskets 75 and 76 are compressed against the enlarged ends of the locking rings 77 and 78 and are thus forced against the surfaces of the pipe 70 and 71, thereby completing the seal in case the locking rings do not make sealing engagement with the pipe. The construction shown in these two figures has the advantage that the sealing gaskets are placed at the rear ends of the locking rings and the enlargement of the rear ends of the locking rings makes it possible to apply a large total force to the rings without applying undesirable high pressure per unit area to the sealing gaskets 75 and 76.

It will be understood that any of the forms of the invention disclosed may be used on any kind of pipe or tubing. In general, however, where the invention is applied to pipe such as black pipe it will be desirable to use gaskets in conjunction with the locking rings. Where seamless tubing or smooth pipe ends are to be joined, the gaskets can generally be omitted, as the locking rings will themselves make sealing engagement with the pipe.

The present invention may be embodied in forms other than those particularly disclosed and hence the present disclosure is merely illustrative in compliance with the patent statutes and is not to be considered as limiting.

Having described my invention, I claim:

1. A joint structure for black pipe or the like, comprising a straight section of the pipe having a substantially uninterrupted outer surface, a concentric sleeve of obdurate ductile metal encircling the pipe section and having at one end a continuous unbroken end face defining a corner with the inner wall of the sleeve; means including an inclined surface engaging the outer edge of the first mentioned end of the sleeve as the latter moves longitudinally on the pipe section and progressively contracting said sleeve end, whereby the outer edge of the sleeve end laps with said inclined surface and the inner corner of the sleeve end laps with the pipe surface, and the said inner corner is forced into the pipe; means engaging the other end of the sleeve to move it towards the inclined surface; and means for preventing longitudinal movement of the pipe section while the sleeve is moving.

2. The combination set forth in claim 1, in which the sleeve has a wall thickness less than that of the pipe section.

3. The combination set forth in claim 1, in which gasket means is provided forming a seal adjacent one end of the sleeve.

4. The combination set forth in claim 1, in which gasket means is provided forming seals at each end of the sleeve.

5. The combination set forth in claim 1, in which the sleeve is in two distinct end-to-end sections.

6. The combination set forth in claim 1, in which the sleeve is provided with an annular groove dividing it into two sections.

7. The combination set forth in claim 1, in which the said inclined surface is at an angle of between 15° and 23° to the pipe axis.

8. The combination set forth in claim 1, in which the end of the sleeve distant from said inclined surface is enlarged and cooperates with a correspondingly sized gasket carried by the sleeve-moving means.

In testimony whereof I affix my signature.

WYLIE G. WILSON.